Feb. 16, 1960   P. KEIDING ET AL   2,924,847
METHOD AND APPARATUS FOR NODULIZATION OF PULVERULENT MATERIALS
Filed Sept. 6, 1955   3 Sheets-Sheet 2
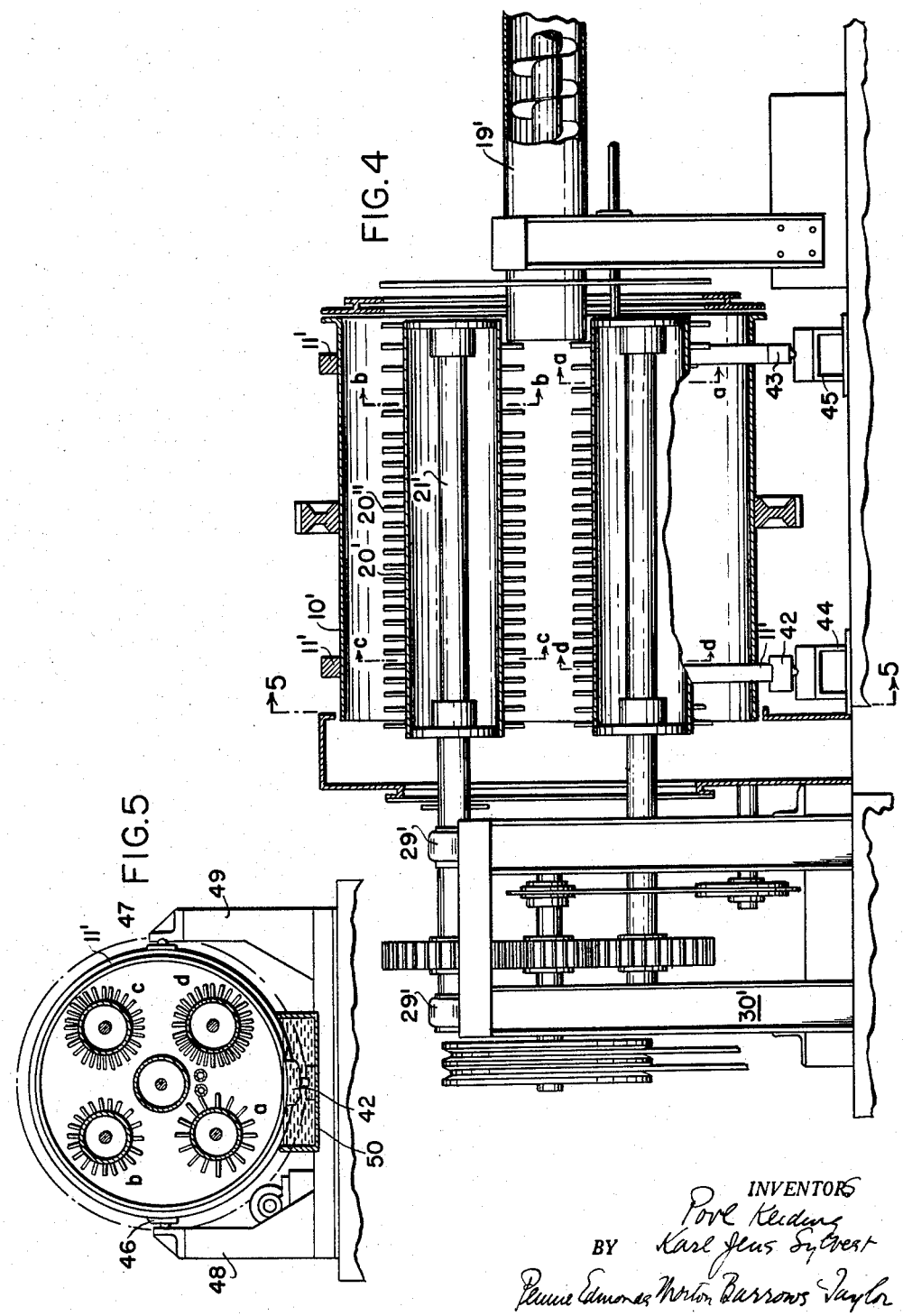
INVENTORS
Povl Keiding
Karl Jens Sylvest
BY Pennie Edmonds Morton Barrows Taylor

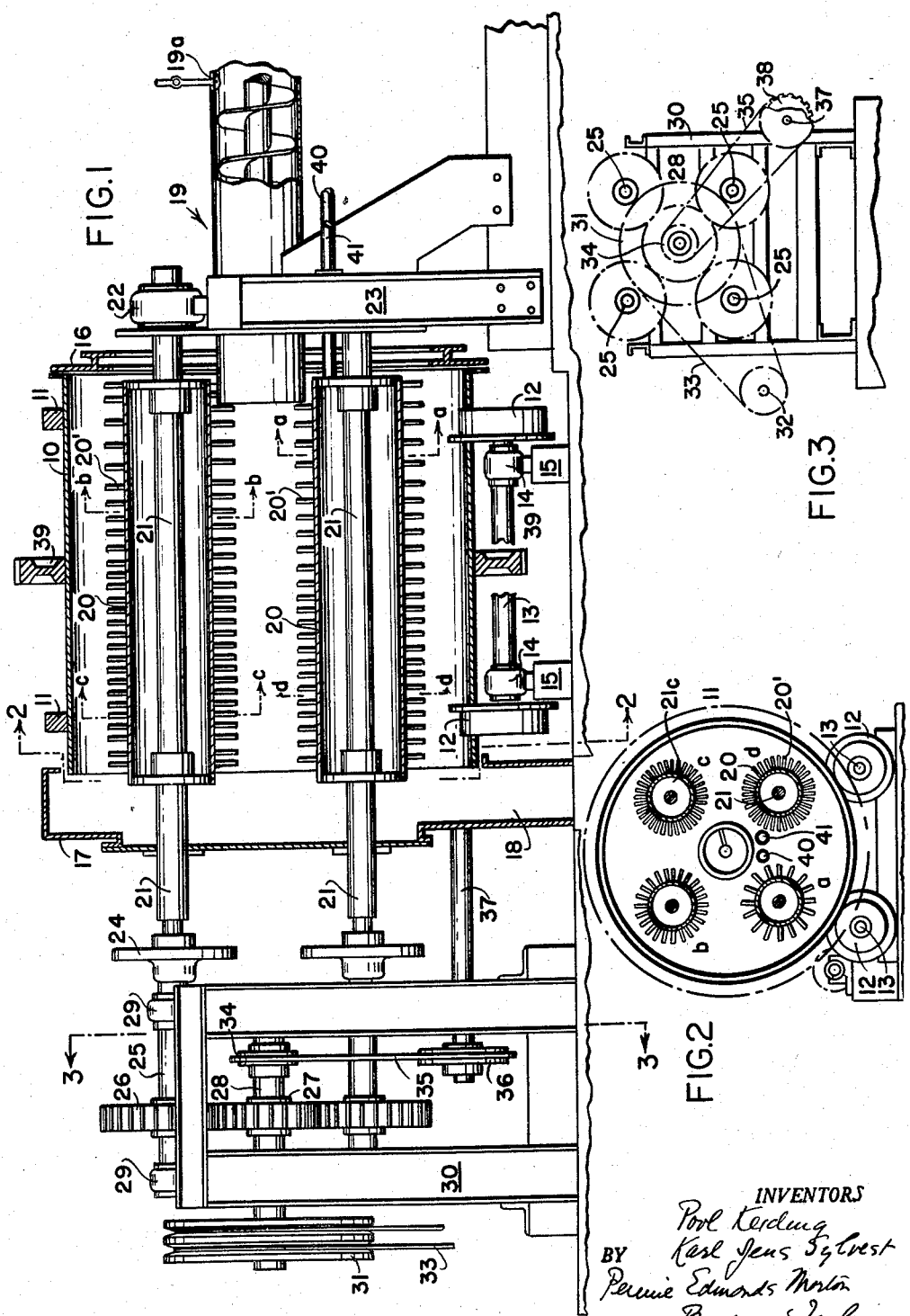

United States Patent Office 2,924,847
Patented Feb. 16, 1960

2,924,847

METHOD AND APPARATUS FOR NODULIZATION OF PULVERULENT MATERIALS

Povl Keiding and Karl Jens Sylvest, Copenhagen, Denmark, assignors to F. L. Smidth & Co., New York, N.Y., a corporation of New Jersey Application September 6, 1955, Serial No. 532,519

Claims priority, application Great Britain September 14, 1954

12 Claims. (Cl. 18—1)

This invention relates to the treatment of pulverulent materials to produce nodules thereof, which can be more advantageously handled than the materials in their pulverulent condition in such operations as burning in a rotary kiln. More particularly, the invention is concerned with a novel method, by which pulverulent materials may be formed into strong nodules of uniform size, shape, and structure, and with an apparatus, by which the method can be advantageously practiced. The apparatus in one form can be operated at higher output rate than is obtainable in comparable prior equipment, and, in another form, can be constructed at lower cost than the prior apparatus.

In the nodulizing of pulverulent materials, the nodules produced may vary in diameter, depending on the treatment, to which the nodules are to be subjected, and the range in diameter may be between 0.25 mm. and 10 mm. In all cases, it is important that the nodules should be uniform in size and shape and they should also be dense and strong. The production of nodules has heretofore been carried on in apparatus including a slowly rotating drum, and some forms of the apparatus are provided with a rapidly rotating beating device working close to the bottom of the drum within the body of material. Liquid is supplied to the drum to effect the nodulization and, if the supply of liquid is properly controlled, such an apparatus will produce satisfactory nodules, although the output of the apparatus is low considering its size.

In the practice of the method of the invention, the pulverulent material in moist condition is maintained in a thin layer of hollow generally cylindrical form and the material in the layer is converted into nodules by being repeatedly beaten at a multiplicity of spaced points. The material in the layer is caused to advance axially of the layer by continuously supplying material to the layer at one end and continuously withdrawing nodules from the layer at the other end. At least a part of the moisture is added to the material adjacent to the point at which the material is supplied to the layer and, if desired, part of the moisture may be added to the material before the latter is supplied to the layer. The material may be maintained in the form of the layer by the beating action alone, although, if desired, the layer may be subjected to centrifugal force developed by rotating the layer on its axis and such force may contribute to the maintenance of the layer.

The apparatus for practicing the method includes a drum into which the material is fed at one end while the nodules are discharged at the other. Beating means having a plurality of beating elements maintain the material in the form of a thin layer covering the inner surface of the drum and also subject the material in the layer to repeated impacts. A single shaft coaxial with the drum may be employed or a plurality of shafts may be disposed equiangularly about and parallel to the drum axis and the drum may be stationary or rotary and mounted with its axis horizontal, vertical, or inclined. The beating elements are rods or spikes carried by the shaft or shafts and terminating close to the drum wall.

For a better understanding of the invention, reference may be made to the accompanying drawings, in which:

Fig. 1 is a vertical axial section through the drum of one form of the apparatus for practicing the method of the invention with the driving mechanism of the apparatus shown in elevation;

Fig. 2 is a sectional view generally on the line 2—2 of Fig. 1 but with respective beating devices shown in section on the lines a—a, b—b, c—c, and d—d of Fig. 1;

Fig. 3 is a diagrammatic sectional view on the line 3—3 of Fig. 1;

Fig. 4 is a fragmentary sectional view similar to Fig. 1 showing an apparatus of modified construction;

Fig. 5 is a sectional view on the line 5—5 of Fig. 4 but with respective beating devices shown in section on the lines a—a, b—b, c—c, and d—d of Fig. 4;

Figure 6:
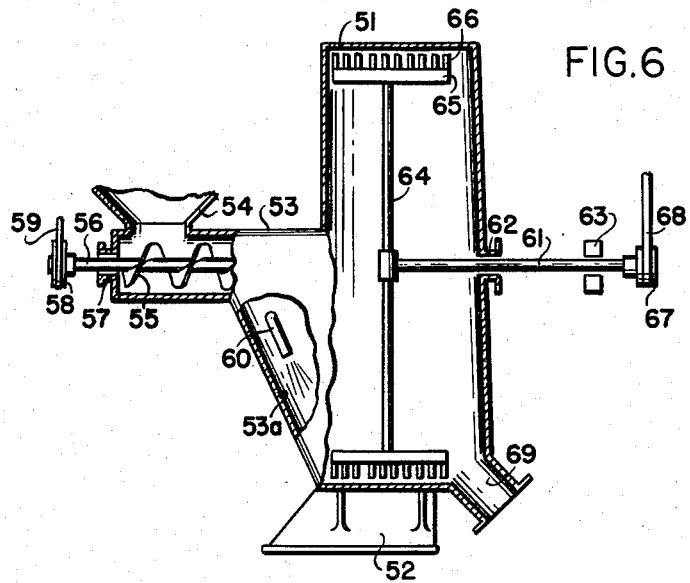
Fig. 6 is a vertical sectional view through a modified form of the apparatus with a stationary horizontal drum.

The form of the new apparatus shown in Figs. 1–3, incl., comprises a rotary drum 10 encircled by spaced live rings 11, which run on rollers 12 mounted on shafts 13 in bearings 14 on foundations 15. At one end, the drum is partially closed by a fixed end casing 16 and the other end of the drum extends within a fixed end casing 17 having a discharge chute 18 leading from its bottom. The material to be nodulized is fed into the drum by a screw conveyor 19, which extends into the drum through a central opening through casing 16.

Four beating devices are disposed within the drum and each device consists of a metal cylinder 20 mounted on a shaft 21 and provided with beating elements in the form of metal rods or spikes 20' secured to the outer surface of the cylinder, as by welding. The spikes are preferably arranged in rows extending circumferentially of the cylinder and the spacing between adjacent spikes in the rows and also between the rows decreases in the direction of travel of the material from the inlet end adjacent casing 16 to the outlet end. Thus, as shown in Fig. 2, there may be sixteen beating elements per row as indicated by the section line a—a adjacent the drum inlet and the number increases to twenty-four elements per row at the line b—b and to thirty-two elements per row at the line c—c. The beating elements on the cylinders extend radially to terminate close to the inner surface of the drum 10 to prevent the material from sticking to the drum wall and one beater may advantageously be provided with beating elements somewhat longer than those on the other beaters. The beater with the longer beating elements is preferably that subjected to the smallest load and, in the construction with four beaters illustrated, the beater with the smallest load is that located in the upper half of the drum adjacent the downwardly moving wall, that is, the beater marked 21c in Fig. 2. The minimum distance between the beating elements on beater 21c and the drum wall may be 5 mm., while the corresponding distance for the elements of the other beaters may be 10 mm.

The beaters are driven through a common drive mechanism and, in the form of the apparatus shown in Figs. 1–3, incl., the beater shafts 21 are mounted at one end of the drum in bearings 22 supported on framework generally designated 23, which also provides support for the screw conveyor 19. At the other end of the drum, each shaft is connected by a flexible coupling 24 to a drive shaft 25, which carries a pinion 26 meshing with a central pinion 27 on a main drive shaft 28. Shafts 25 are mounted for rotation in bearings 29 on a frame structure 30, which carries bearings for shaft 28, and the latter shaft projects beyond the structure and carries a pulley 31 driven by a motor, indicated diagrammatically at 32, through belts 33. Shaft 28 carries a sprocket wheel 34 connected by a chain 35 to a sprocket wheel 36 on shaft 37, which carries a pinion 38 meshing with a girth gear 39 encircling the drum.

The liquid for moistening the material is introduced into the drum through pipes 40, 41 extending through casing 16 into the inlet end of the drum and provided with orifices, through which the liquid supplied under pressure enters the drum in finely divided condition. The pipes and their orifices are so arranged that the liquid does not strike the beaters and the pipes may extend different distances into the drum. Also more than two pipes may be employed, if desired. The rate, at which the liquid is discharged through the pipes into the drum, is controlled by a suitable valve and, in order that the ratio of liquid to material may be controlled, the material may be weighed before being introduced into the screw conveyor 19.

In the practice of the invention by the apparatus shown in Figs. 1–3, incl., the material to be nodulized is continuously introduced into the drum by the screw conveyor 19 and is immediately caused to form a thin layer covering the inner surface of the drum partly by the action of the beaters and partly by the rotation of the drum. The liquid, ordinarily water, which is supplied in finely divided condition through pipes 40, 41, moistens the material close to the place where it enters the drum. The continuous supply of material to the layer at one end causes the material in the layer to advance axially of the drum and, during the travel of the layer, it is subjected to repeated impacts by the beating elements on the cylinders 20. The beaters are all rotated in the same direction as the drum and at a much faster rate. Thus a drum 3' 6" in diameter may be rotated at 40 r.p.m., whereas the beaters used in such a drum and measuring 15" in diameter across the ends of the beating elements may be rotated at 400 r.p.m. In such an apparatus, with the drum 3' 6" long, an output of 6 tons of nodules of cement raw material per hour is obtainable.

In some cases, it may be desirable to add a part of the moisture to the material before it enters the nodulizing drum and, for this purpose, the material may be passed preliminarily through an ordinary rotating drum, in which the nodulizing liquid is discharged upon the material by one or more spray heads. The amount of moisture so supplied is inadequate for the production of nodules and the material discharged from the drum is introduced immediately into the nodulizing drum, as, for example, by the screw conveyor 19. Instead of preliminarily adding moisture to the material in a drum, one or more spray heads 19a may be mounted in openings in the casing of the screw conveyor 19 to discharge liquid upon the material being advanced to the drum. The amount of moisture employed to produce nodules varies with the material being nodulized and depends upon its physical characteristics, including its plasticity. Ordinarily the amount of liquid added to the pulverulent material lies within the range of 10% to 20% by weight of the final mixture.

The size of the nodules produced in the apparatus may be controlled by varying the spacing between the beating elements on the cylinders, the size varying directly with the spacing. The density of the nodules depends on the speeds of rotation of the drum and beaters, with the density increasing with an increase in speed. With the apparatus described, it is possible to produce dense nodules of small size averaging, for example, 3 mm. in diameter.

Since the clearance between the ends of the beating elements and the inner surface of the drum is small, the drum must be securely supported in position during rotation and slide shoes rather than rollers are preferably employed as drum supports. A drum resting upon slide shoes is illustrated in Figs. 4 and 5.

In the construction shown in Figs. 4 and 5, the drum 10' is identical in construction to that shown in Fig. 1 and it is encircled by a pair of live rings 11'. At their lowermost points, these rings are supported by and slide on slide shoes 42, 43 resting on foundations 44, 45, respectively. Shoe 42 has flanges engaging the opposite faces of its live ring and preventing the ring from moving in the direction of the drum axis, while shoe 43 is without flanges and permits its ring to move axially as a result, for example, of temperature variations. In addition to the shoes 42, 43, each live ring 11' is engaged laterally by slide shoes 46, 47 lying in a horizontal plane through the drum axis and mounted on standards 48, 49, respectively.

As shown in Fig. 5, each of the slide shoes 42, 43 is immersed in an oil bath in a vessel 50, which has been omitted from Fig. 4 for the sake of clearness. The oil level in the bath is such that each live ring 11' dips slightly into the oil, so that an oil film is maintained on the sliding surfaces.

In the construction shown in Figs. 4 and 5, the shafts 21' of the beaters, which include cylinders 20' and spikes 20", are not supported at the inlet end of the drum but are mounted for rotation in bearings 29' on the framework 30'. The mounting of the beater shafts shown in Fig. 4 is particularly suitable for forms of the apparatus, in which the drums are relatively small and, with the shafts 21' supported only at one end, the shafts extend as a unit from bearings 29' and no flexible couplings are employed. The drive of the shafts and drum shown in Fig. 4 is the same as that described in connection with the apparatus shown in Fig. 1.

The apparatus shown in Figs. 4 and 5 is operated in the practice of the method in the same way as the apparatus illustrated in Figs. 1–3, incl., so that the description of the operation need not be repeated.

The two forms of apparatus shown in Figs. 1–5, incl., include a rotating drum and the material is maintained in a thin layer on the inner surface of the drum partly by centrifugal action and partly by the action of the beaters. Such forms of apparatus have a substantially higher rate of output than comparable prior nodulizing apparatus including a drum of the same dimensions and a beating device rotating in a mass of material at the bottom of the drum. When the cost of supporting and driving a rotary drum is not warranted and a lower output rate is acceptable, the apparatus shown in Fig. 6 may be employed in the practice of the new method. This apparatus includes a stationary drum 51 mounted on a foundation 52 with its axis horizontal and having an inlet casing 53 with a hopper 54. Beneath the hopper is a conveyor screw 55 carried by the shaft 56 mounted for rotation in a bearing 57 attached to the wall of casing 53. Outside the casing, shaft 56 carries a pulley 58, which may be driven from any suitable prime mover by a belt or chain 59. The inlet casing has a sloping surface 53a leading to the bottom of the drum and material advanced from beneath the hopper by screw 55 slides down the surface to enter the drum. A water pipe 60 having spray orifices discharges water upon the material as it enters the drum.

A shaft 61 is mounted coaxially with the drum in bearings, shown diagrammatically at 62, 63, and the shaft extends into the drum where it carries at its inner end a plurality of spokes 64 each having a head 65 at its outer end. The heads extend axially of the drum and are provided with a plurality of beating elements 66 in the form of spikes or rods terminating close to the wall of the drum. At its outer end, the shaft 61 is provided with a pulley 67 by which it may be driven by a suitable prime mover through belt 63.

In the operation of the apparatus shown in Fig. 6, the material to be nodulized flows from hopper 54 into the inlet casing in position to be advanced by the screw 55 and the material slides down the sloping surface 53a to enter drum 51. The material is moistened adjacent the place where it enters the drum and is immediately formed into a layer on the inner surface of the drum by the action of the beating elements. The shaft is rotated at a high speed, such as 500 r.p.m. in a drum 3' in diameter, and the repeated impacts of the beating elements upon the material in the layer convert the material into nodules. The material in the layer is advanced axially of the drum by the pressure of the material entering the drum along the sloping surface 53a and the nodules pass out of the layer and leave the drum through an outlet pipe 69. If desired, the heads 65 may be inclined to the axis of the drum, so that the beating elements contribute to the axial movement of the material in the layer.

In the apparatus shown in Fig. 6, there may be eight spokes 64 with heads 65 and, if it is desired to employ a larger number of beating elements, they may be mounted on a continuous band of cylindrical form supported on the spokes and replacing the heads. When such a band is employed, it may be desirable to provide the end facing the inlet casing with an internal flange or to close the end of the band by a circular plate in order to prevent incoming material from reaching the inner surface of the band.

Figure 7:
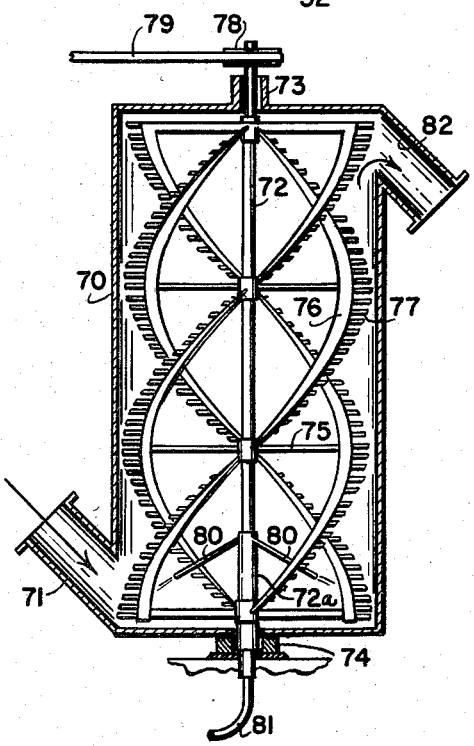
Fig. 7 is a vertical sectional view of a modified form of the apparatus having a vertical stationary drum.

The form of the apparatus illustrated in Fig. 7 includes a drum 70 mounted with its axis vertical and having an inlet pipe 71 leading to the bottom of the drum. A shaft 72 is mounted coaxially with the drum in upper and lower bearings indicated diagrammatically at 73, 74 and the shaft carries a plurality of spokes 75 on which are mounted a plurality of helical bars 76 illustrated as four in number. The bars carry beating elements 77 in the form of spikes projecting outwardly from the bars and terminating close to the inner surface of the drum. At its upper end, the shaft carries a pulley 78 by which it may be driven by a suitable prime mover through the belt or chain 79. At its lower end, the shaft has a hollow section 72a on which are mounted pipes 80 having spray orifices and water is supplied to the hollow section of the shaft by a pipe 81. The water escaping through the orifices of pipes 80 moistens the material entering the inlet 71, so that the material can be nodulized.

In the operation of the apparatus of Fig. 7, the shaft is rotated at such a rate that the material entering the inlet pipe is maintained by the beating elements 77 in a thin layer covering the inner surface of the drum. The material in the layer is caused to move upward toward an outlet pipe 82 leading from the upper end of the drum and in the upward travel of the material, it is subjected to repeated impacts by the beating elements and formed into nodules.

In the forms of the apparatus shown in Figs. 6 and 7, the material to be nodulized may be given part of the necessary moisture content outside the drum. Also, in both forms of apparatus, the drum may be rotated, as in the apparatus of Figs. 1–5, incl.

We claim:
1. A method of forming nodules of pulverulent material in a cylindrical chamber, which comprises continuously supplying the material to the chamber at one end thereof, adding moisture to the material, repeatedly beating the material toward the inner surface of the chamber at a multiplicity of locations distributed about said surface and lying on opposite sides of the longitudinal axis of the chamber, forming the material into a thin layer covering the entire inner surface of the chamber, causing the material in the layer to advance axially of the layer towards the other end of the chamber, the beating action being of such intensity as to assist in maintaining the material in said layer and converting the material in the layer into nodules, and continuously withdrawing the nodules from said other end of the chamber.

2. The method of claim 1, in which at least part of the moisture is added to the material adjacent the point at which the material is introduced into the chamber.

3. The method of claim 1, in which part of the moisture is added to the material before it is introduced into the chamber.

4. The method of claim 1, in which the layer of material is rotated on its axis while the heating action is carried on.

5. The method of claim 1, in which the material is maintained in the layer at least in part by centrifugal force developed by rotating the layer on its axis.

6. An apparatus for nodulizing pulverulent material, which comprises a drum, means for feeding the material into the drum at one end, means for introducing liquid into the drum near the end entered by the material, and means for forming the material into a layer covering the inner surface of the drum and beating the material in the layer, including a plurality of shafts within the drum and projecting out of the drum at at least one end, the shafts lying parallel to the axis of the drum and being angularly spaced about and lying on opposite sides of a vertical plane through that axis, a plurality of beating elements mounted on each shaft and extending outward therefrom to travel close to the inner surface of the drum upon rotation of the shafts, and means for rotating the shafts in the same direction.

7. The apparatus of claim 6, in which the beating elements on the upper shaft adjacent the downwardly moving surface of the drum terminate closer than the beating elements on the other shafts to the drum surface.

8. The apparatus of claim 6, in which the shafts extend out of the drum at one end only of the latter and the projecting portions of the shafts are mounted in spaced bearings.

9. The apparatus of claim 6, in which the beater shafts extend out of the drum at both ends, the ends of the beater shafts at one end of the drum are mounted in respective bearings, drive shafts are mounted in spaced bearings at the other end of the drum in alignment with respective beater shafts, and each beater shaft is connected to a drive shaft by a flexible coupling.

10. The apparatus of claim 6, which includes means for rotating the drum in the same direction as the shaft.

11. The apparatus of claim 10, in which a plurality of shafts carrying heating elements are mounted within the drum parallel to the axis thereof and lie on opposite sides of a vertical plane through the drum axis, means are provided for rotating the shafts in the same direction, and the elements on the upper shaft adjacent the downwardly moving surface of the drum terminate closer than the other beating elements to the drum surface.

12. The apparatus of claim 10, in which the shaft rotating means rotates the shaft at a much faster rate than the drum rotating means rotates the drum.

References Cited in the file of this patent
UNITED STATES PATENTS

| | | |
|---|---|---|
| Re. 21,379 | Glaxner | Mar. 5, 1940 |
| 1,980,130 | Fasting | Nov. 6, 1934 |
| 2,131,686 | Heller et al. | Sept. 27, 1938 |
| 2,139,585 | Hunter | Dec. 6, 1938 |
| 2,162,782 | Middelboe | June 20, 1939 |
| 2,422,989 | Skoog | June 24, 1947 |